US011122087B2

(12) United States Patent
Gu et al.

(10) Patent No.: US 11,122,087 B2
(45) Date of Patent: Sep. 14, 2021

(54) MANAGING CYBERSECURITY VULNERABILITIES USING BLOCKCHAIN NETWORKS

(71) Applicant: Advanced New Technologies Co., Ltd., Grand Cayman (KY)

(72) Inventors: Jun Gu, Hangzhou (CN); Yixiang Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/712,340

(22) Filed: Dec. 12, 2019

(65) Prior Publication Data
US 2020/0412766 A1    Dec. 31, 2020

Related U.S. Application Data

(63) Continuation of application No. PCT/CN2019/093365, filed on Jun. 27, 2019.

(51) Int. Cl.
*H04L 29/06* (2006.01)
*H04L 9/32* (2006.01)
(Continued)

(52) U.S. Cl.
CPC ............ *H04L 63/20* (2013.01); *G06F 21/577* (2013.01); *H04L 9/0894* (2013.01);
(Continued)

(58) Field of Classification Search
None
See application file for complete search history.

(56) References Cited

U.S. PATENT DOCUMENTS 7,308,712 B2 * 12/2007 Banzhof .............. G06F 21/577
  726/22
7,752,669 B2 * 7/2010 Palliyil ................ G06F 21/566
  713/187

(Continued)

FOREIGN PATENT DOCUMENTS

CN    106372514    2/2017
CN    107169765    9/2017
(Continued)

OTHER PUBLICATIONS

Helebrandtetal.; Blockchain Adoption for Monitoring and Management of Enterprise Networks; 2019; retrieved from the Internet https://ieeexplore.ieee.org/abstract/document/8614960; pp. 1-5 as printed. (Year: 2019).*

(Continued)

*Primary Examiner* — Michael W Chao
(74) *Attorney, Agent, or Firm* — Fish & Richardson P.C.

(57) ABSTRACT

Disclosed herein are methods, systems, and apparatus, including computer programs encoded on computer storage media, for cybersecurity vulnerability management. One of the methods includes receiving a vulnerability report indicating a cybersecurity vulnerability by a blockchain network. The blockchain network provides access to the vulnerability report to an administration server. A vulnerability verification report indicating a verification of the cybersecurity vulnerability from the administration server is received by the blockchain network. The blockchain network stores information of the cybersecurity vulnerability into a vulnerability record that is stored on the blockchain network. The blockchain network provides access to the vulnerability record to a service provider, and receives a notification indicating a resolution to the cybersecurity vulnerability from the service provider.

23 Claims, 6 Drawing Sheets

(51) Int. Cl.
  *G06F 21/57* (2013.01)
  *H04L 9/08* (2006.01)
(52) U.S. Cl.
  CPC .......... *H04L 9/3239* (2013.01); *H04L 9/3247* (2013.01); *H04L 63/1433* (2013.01); *H04L 2209/38* (2013.01)

(56) References Cited

U.S. PATENT DOCUMENTS

| | | | |
|---|---|---|---|
| 8,590,047 B2* | 11/2013 | Hoyt | G06Q 10/06 726/25 |
| 9,015,847 B1* | 4/2015 | Kaplan | H04L 63/1441 726/25 |
| 9,349,013 B2* | 5/2016 | D'Mello | G06F 21/57 |
| 9,413,780 B1* | 8/2016 | Kaplan | H04L 63/1466 |
| 9,660,870 B1 | 5/2017 | Kuhr et al. | |
| 9,779,252 B2* | 10/2017 | Sharma | H04L 63/1433 |
| 10,021,138 B2* | 7/2018 | Gill | G06F 21/577 |
| 10,361,843 B1* | 7/2019 | Suthar | G06Q 20/10 |
| 10,382,473 B1* | 8/2019 | Ashkenazy | G06F 21/577 |
| 10,628,764 B1* | 4/2020 | Kaplan | H04L 63/1433 |
| 10,692,033 B2* | 6/2020 | Barday | G06Q 10/067 |
| 10,699,026 B2* | 6/2020 | Goldfarb | H04L 63/20 |
| 10,915,636 B1* | 2/2021 | Kaplan | G06Q 30/0208 |
| 10,958,419 B2* | 3/2021 | Schuler | H04L 63/0428 |
| 2003/0217039 A1* | 11/2003 | Kurtz | G02B 5/3083 |
| 2006/0021052 A1* | 1/2006 | D'Mello | G06F 21/57 726/25 |
| 2006/0075503 A1* | 4/2006 | Bunker | G06F 11/324 726/25 |
| 2006/0164199 A1 | 7/2006 | Gilde et al. | |
| 2007/0006314 A1* | 1/2007 | Costa | G06F 21/554 726/25 |
| 2010/0268759 A1 | 10/2010 | Hepper et al. | |
| 2012/0079107 A1* | 3/2012 | Williams | H04L 41/0853 709/224 |
| 2015/0271142 A1* | 9/2015 | Oliphant | G06F 16/245 726/12 |
| 2016/0112457 A1* | 4/2016 | Lietz | H04L 63/1433 726/1 |
| 2016/0203575 A1* | 7/2016 | Madhu | H04L 67/22 705/319 |
| 2016/0261690 A1* | 9/2016 | Ford | H04L 67/1044 |
| 2017/0178127 A1 | 6/2017 | Kravitz | |
| 2017/0346846 A1* | 11/2017 | Findlay | H04L 63/1433 |
| 2017/0372300 A1 | 12/2017 | Dunlevy et al. | |
| 2018/0040041 A1* | 2/2018 | Metnick | G06Q 30/0609 |
| 2018/0089645 A1 | 3/2018 | McDonald et al. | |
| 2018/0108089 A1 | 4/2018 | Jayachandran | |
| 2018/0117446 A1 | 5/2018 | Tran et al. | |
| 2018/0117447 A1 | 5/2018 | Tran et al. | |
| 2018/0137465 A1 | 5/2018 | Batra et al. | |
| 2018/0174255 A1 | 6/2018 | Hunn et al. | |
| 2018/0219676 A1 | 8/2018 | Mattingly et al. | |
| 2018/0225194 A1* | 8/2018 | Saleh-Esa | G06F 11/3664 |
| 2018/0232526 A1* | 8/2018 | Reid | G06F 21/602 |
| 2018/0255090 A1 | 9/2018 | Kozloski et al. | |
| 2018/0315145 A1 | 11/2018 | Darnell et al. | |
| 2019/0007381 A1* | 1/2019 | Isaacson | G06Q 30/0625 |
| 2019/0013932 A1 | 1/2019 | Maino et al. | |
| 2019/0051390 A1 | 2/2019 | Shah | |
| 2019/0102755 A1 | 4/2019 | Owens et al. | |
| 2019/0108140 A1 | 4/2019 | Deshpande et al. | |
| 2019/0109717 A1* | 4/2019 | Reddy | H04L 9/0643 |
| 2019/0123889 A1 | 4/2019 | Schmidt-Karaca | |
| 2019/0132350 A1 | 5/2019 | Smith et al. | |
| 2019/0138716 A1* | 5/2019 | Huang | H04L 41/0686 |
| 2019/0141054 A1* | 5/2019 | Signorini | H04W 12/1006 |
| 2019/0147174 A1 | 5/2019 | Narasimhan et al. | |
| 2019/0188804 A1 | 6/2019 | Parry | |
| 2019/0207968 A1* | 7/2019 | Heckman | H04L 63/1425 |
| 2019/0229915 A1* | 7/2019 | Digiambattista | H04L 9/321 |
| 2019/0251199 A1 | 8/2019 | Klianev | |
| 2019/0339687 A1* | 11/2019 | Cella | G05B 23/0229 |
| 2019/0340269 A1 | 11/2019 | Biernat et al. | |
| 2019/0384842 A1 | 12/2019 | Rao | |
| 2019/0394050 A1* | 12/2019 | Goeringer | H04L 9/3239 |
| 2020/0014720 A1* | 1/2020 | Giura | H04L 63/20 |
| 2020/0028691 A1 | 1/2020 | Rao et al. | |
| 2020/0053117 A1* | 2/2020 | Mandal | H04L 63/1433 |
| 2020/0084097 A1* | 3/2020 | Marks | H04L 61/2015 |
| 2020/0162473 A1* | 5/2020 | Mercuri | G06Q 20/389 |
| 2020/0204524 A1* | 6/2020 | Simons | G06Q 20/0658 |
| 2020/0228570 A1* | 7/2020 | Strosaker | H04L 9/3239 |
| 2020/0394309 A1* | 12/2020 | Angelo | H04L 9/30 |

FOREIGN PATENT DOCUMENTS

| | | |
|---|---|---|
| CN | 108573341 | 9/2018 |
| CN | 108898021 | 11/2018 |
| CN | 108965247 | 12/2018 |
| CN | 109034833 | 12/2018 |
| CN | 109544192 | 3/2019 |
| CN | 109639464 | 4/2019 |
| CN | 109639646 | 4/2019 |
| CN | 109767190 | 5/2019 |

OTHER PUBLICATIONS

Kostal et al.; Management and Monitoring of IoT Devices Using Blockchain; 2019; Retrieved from the Internet https://www.mdpi.com/1424-8220/19/4/856; pp. 1-12, as printed. (Year: 2019).*
PCT International Search Report and Written Opinion in International Application No. PCT/CN2019/093349, dated Mar. 27, 2020, 7 pages.
PCT International Search Report and Written Opinion in International Application No. PCT/CN2019/093371, dated Mar. 27, 2020, 8 pages.
U.S. Appl. No. 16/711,952, Gu et al., filed Dec. 12, 2019.
U.S. Appl. No. 16/712,412, Sun et al., filed Dec. 12, 2019.
PCT International Search Report and Written Opinion in International Application No. PCT/CN2019/093365, dated Mar. 27, 2020, 6 pages.
Crosby et al., "BlockChain Technology: Beyond Bitcoin," Sutardja Center for Entrepreneurship & Technology Technical Report, Oct. 16, 2015, 35 pages.
docs.microsoft.com [online], "Blockchain Workflow Application," Dec. 2019, retrieved on Jan. 31, 2020, retrieved from URL<https://docs.microsoft.com/en-us/azure/architecture/solution-ideas/articles/blockchain-workflow-application>, 4 pages.
Nakamoto, "Bitcoin: A Peer-to-Peer Electronic Cash System," www.bitcoin.org, 2005, 9 pages.
Extended European Search Report in European Application No. 19763410.8, dated Jul. 14, 2020, 9 pages.
Su et al., "Crowdsourcing Platform for Collaboration Management in Vulnerability Verification," 18th Asia-Pacific Network Operations and Management Symposium (APNOMS), Oct. 2016, pp. 1-4.

* cited by examiner

MANAGING CYBERSECURITY VULNERABILITIES USING BLOCKCHAIN NETWORKS

CROSS-REFERENCE TO RELATED APPLICATIONS

This application is a continuation of PCT Application No. PCT/CN2019/093365, filed on Jun. 27, 2019, which is hereby incorporated by reference in its entirety.

TECHNICAL FIELD

This specification relates to managing cybersecurity vulnerabilities using a blockchain network.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

In some instances, a service providing platform (e.g., a network-based platform) can include one or more service providers that provide computer-implemented services (e.g., software applications or interfaces) using one or more computer systems or networks. In some instances, the computer systems or networks may have cybersecurity vulnerabilities exploitable by malicious actors to perform unauthorized actions, resulting in data loss or data leakage. Solutions to address and manage cybersecurity vulnerabilities and thus provide enhanced data security of the network platform would be desirable.

SUMMARY

This specification describes technologies for cybersecurity vulnerability management. These technologies generally involve managing cybersecurity vulnerabilities based on a blockchain network. In some embodiments, parties involved in a security vulnerability management of a service providing platform, such as one or more of a service provider, a service user, an administrator or regulator, or a security specialist can be integrated by a blockchain network. Each of the parties can be a participant or a client of the blockchain network. Each party can process information related to the cybersecurity vulnerabilities by interacting with the blockchain network, for example, via a smart contract. The blockchain-based cybersecurity vulnerability management can provide defined interfaces and easy access to the parties and provide enhanced data security of the service providing platform.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
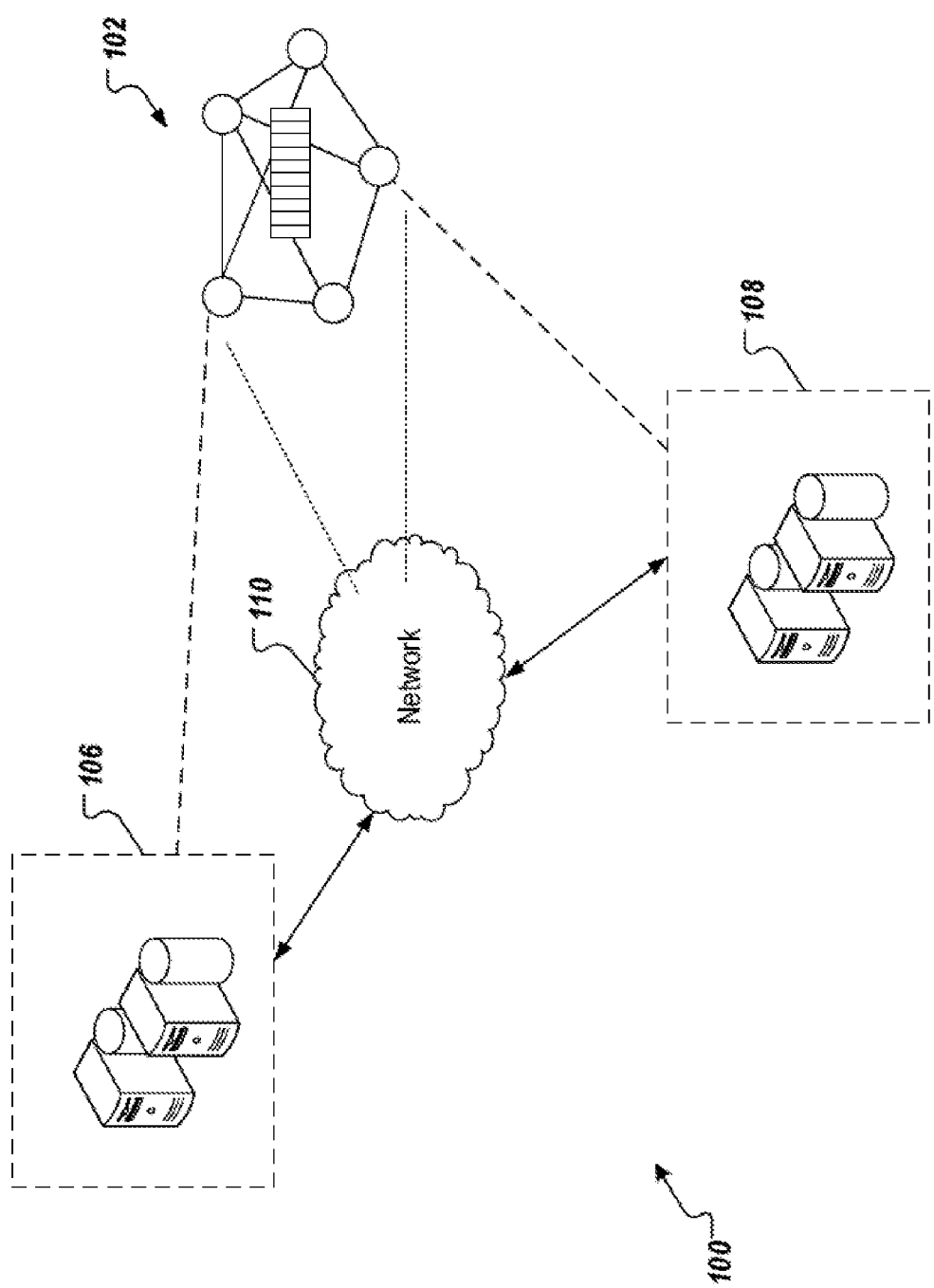
FIG. 1 is a diagram illustrating an example of an environment that can be used to execute embodiments of this specification.

This specification describes technologies for cybersecurity vulnerability management. These technologies generally involve managing cybersecurity vulnerabilities based on a blockchain network. In some embodiments, parties involved in a security vulnerability management of a service providing platform, such as one or more of a service provider, a service user, an administrator or regulator, or a security specialist can be integrated by a blockchain network. Each of the parties can be a participant or a client of the blockchain network. Each party can process information related to the cybersecurity vulnerabilities by interacting with the blockchain network, for example, via a smart contract. The blockchain-based cybersecurity vulnerability management can provide defined interfaces and easy access to the parties and provide enhanced data security of the service providing platform.

As described herein, a cybersecurity vulnerability can be a weakness (in software, hardware, and/or network, etc.) that can be exploited by a threat actor, such as a cyber-attacker, to perform unauthorized actions within a computer system or network. In some embodiments, a security specialist, such as an ethical computer hacker (also known as "a white hat hacker") can perform tests on one or more computer systems and networks to assess computer security and identify cybersecurity vulnerabilities. Resolutions (e.g., a software patch, an upgraded firewall, etc.) can be provided to remedy the identified cybersecurity vulnerabilities, so as to improve security by exposing vulnerabilities before malicious hackers (e.g., "black hat hackers") can detect and exploit them.

The techniques described in this specification produce several technical effects. In some embodiments, the blockchain network maintains a vulnerability record that includes information of one or more identified cybersecurity vulnerabilities and resolutions to the vulnerabilities. The blockchain network can grant and modify access authorities of different participating entities to the vulnerability record. In some embodiments, the vulnerability record can be tamper-resistant, thus establishing enhanced trust among the different participating entities. By storing the vulnerability record on the blockchain network, information about identified cybersecurity vulnerabilities and resolutions to the vulnerabilities can be more secure and reliable since the vulnerability record is immutable. For example, malicious actors cannot remove cybersecurity vulnerabilities from the vulnerability record with the intention of using the unrecorded vulnerability to compromise the network, or cannot add a fictitious resolution of a vulnerability to the record with the intention of using the unresolved vulnerability to compromise the network.

In some embodiments, a security specialist can submit a vulnerability report that includes information of one or more cybersecurity vulnerabilities to the blockchain network and the blockchain network determines whether the security specialist is authorized to submit the vulnerability report. This prevents unauthorized entities from publishing malicious content to the blockchain network that compromises the security of the blockchain network.

In some embodiments, an administrator (e.g., a regulator) accesses the blockchain network to obtain the vulnerability report and verifies whether the cybersecurity vulnerabilities identified in the vulnerability report actually exist. The blockchain network can determine whether the administrator is authorized to access the vulnerability report before granting an access to the administrator. This prevents unauthorized entities from obtaining the information of the identified cybersecurity vulnerabilities. If an unauthorized entity, such a malicious actor, obtains the vulnerability report, the malicious actor can exploit the vulnerabilities identified in the report, breach into the computer system and network, and infiltrate protected data. As such, the techniques as described herein improve security of the computer systems, networks, and database systems implementing the techniques.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
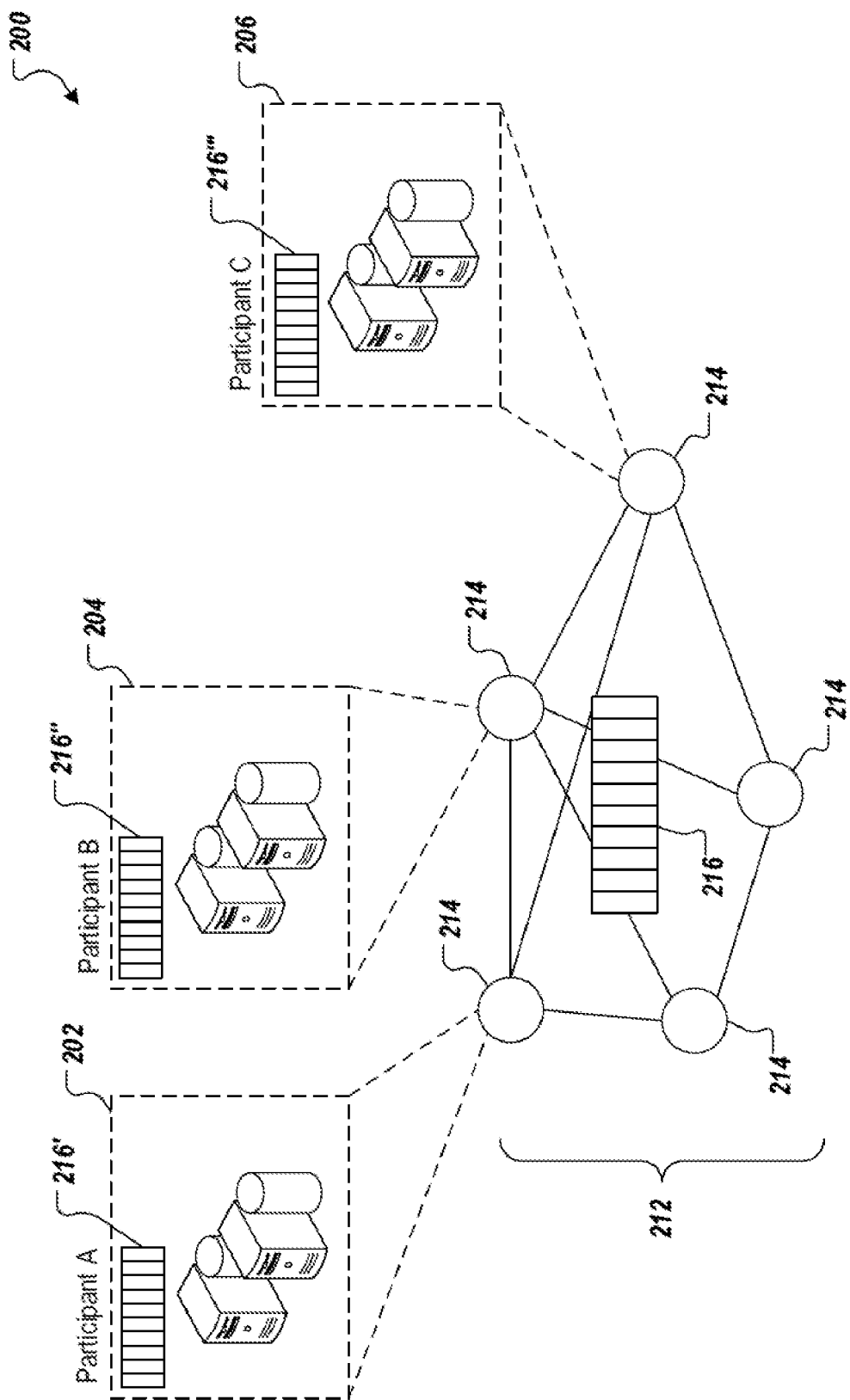
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
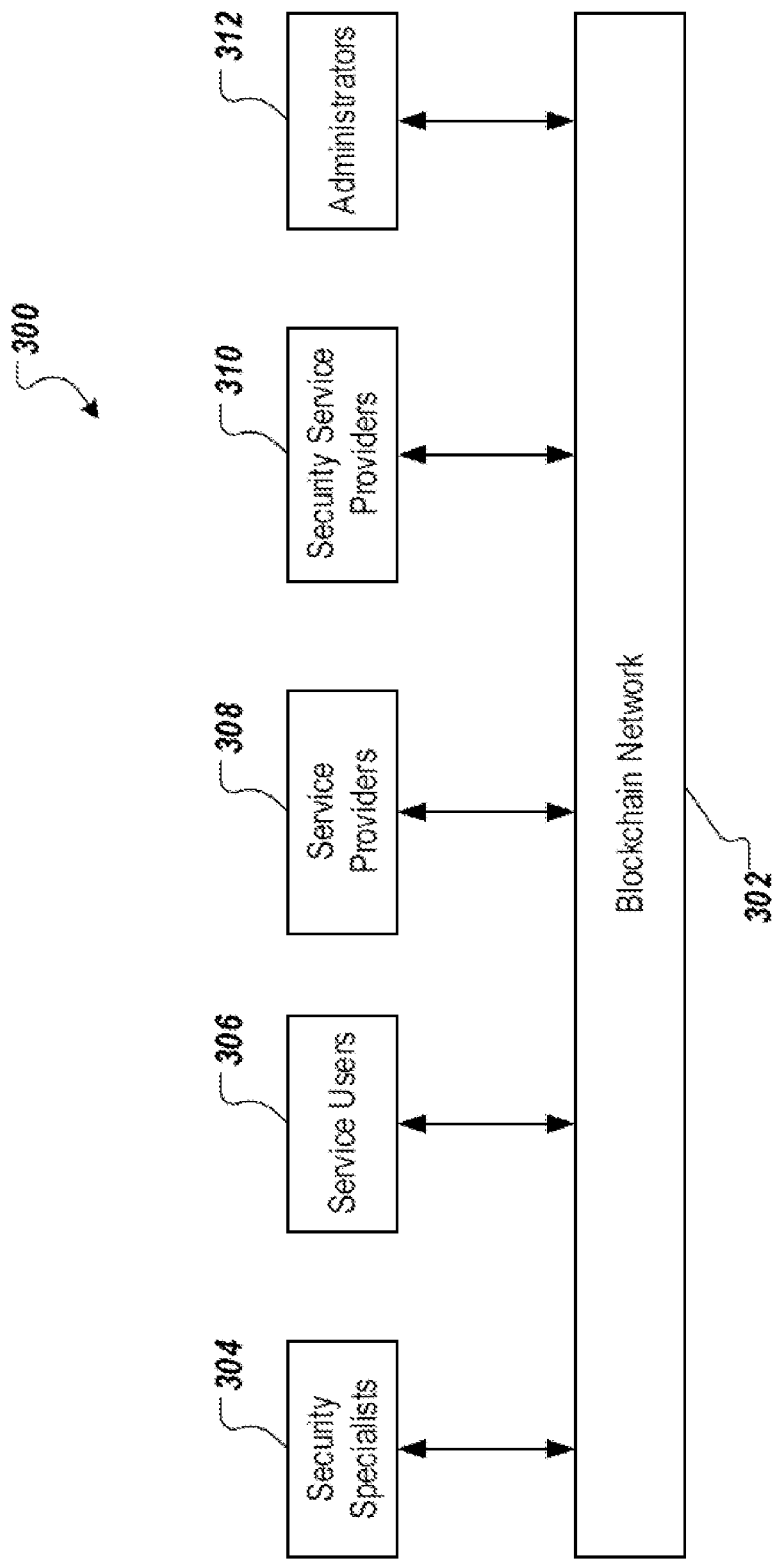
FIG. 3 is a diagram illustrating an example of a system in accordance with embodiments of this specification.

FIG. 3 is a diagram illustrating an example of a system 300 in accordance with embodiments of this specification. The example system 300 manages service vulnerabilities based on a blockchain network. As shown, the system 300 includes a blockchain network 302, one or more security specialists 304, one or more service users 306, one or more service providers 308, one or more security service providers 310, and one or more administrators 312. In some embodiments, the blockchain network 302 can be a consortium blockchain network. In some embodiments, each of the one or more security specialists 304, one or more service users 306, one or more service providers 308, one or more security service providers 310, and one or more administrators 312 can include or be associated with a client device or node of the blockchain network 302. A client device can include, for example, any suitable computer, module, server, or computing element programmed to perform methods described herein.

As described herein, a service vulnerability can be a weakness (in software, hardware, and/or network, etc.) that can be exploited by a threat actor, such as a cyber-attacker, to perform unauthorized actions within a computer system or network. For example, the service vulnerability can be a cybersecurity vulnerability. In general, the system 300 manages service vulnerabilities of services from the service providers 308 such that each of the participants involved in the security vulnerability management can process information related to the service vulnerabilities by interacting with the blockchain network 302.

A security specialist 304 can be associated with a computer security expert, or an ethical computer hacker (also known as "white hat hackers"). For example, the security specialist 304 can perform penetration testing and in other testing methodologies that ensure the security of an organization's information system. For example, a security specialist 304 can be a computer security specialist who breaks into protected systems and networks to test and assess their security. A security specialist 304 can improve security by exposing vulnerabilities before malicious hackers (e.g., "black hat hackers") can detect and exploit them. For example, a security specialist 304 can perform penetration testing to uncover security vulnerabilities. Penetration testing involves gathering information about a target of the testing, such as a network or web application, identifying possible entry points, trying to break in though those points, and then reporting the finding of the test. A security specialist 304 can also perform a denial-of-service attack on a cloned version of a company's system, or on the system itself when the critical usage is at a minimum. A security specialist 304 can also use security scanners and frameworks to find security vulnerabilities.

A service user 306 can be a user or client of services provided by the service provider 308. A service provider 308 can be a provider of services (e.g., software, hardware, and/or network resources, etc.) in a computer system or network. A security service provider 310 can be a provider of security services. For example, a security service provider 310 can provide solutions (e.g., anti-malwares, network firewall, etc.) for vulnerabilities of services from a service provider 308. An administrator 312 can be an entity (e.g., a regulator, (e.g., government or governing agency) or an administrator or owner of the blockchain network 302) having authority to manage vulnerabilities of the one or more services provided by the one or more service providers 308. For example, the administrator 312 can be authorized to manage or conduct surveillance on the service vulnerabilities identified by the security specialists 304. The service user 306, the service provider 308, the security service provider 310, and the administrator 312 as described herein can include or be associated with any suitable computer, module, server, or computing element programmed to perform the methods described herein.

In some embodiments, a security specialist 304 can identify service vulnerabilities (e.g., cybersecurity vulnerabilities) of a service provided by a service provider 308 and submit a vulnerability report to the blockchain network 302. The blockchain network 302 allows access to the vulnerability report to an administrator 312 so that the administrator 312 can read the vulnerability report from the blockchain network 302. The administrator 312 verifies the service vulnerabilities in the vulnerability report and determines whether the service vulnerabilities actually exist or are valid. After verifying the service vulnerabilities in the vulnerability report, the administrator 312 generates and sends a vulnerability verification report to the blockchain network 302. The blockchain network 302 can generate or update a vulnerability record based on the vulnerability report and the vulnerability verification report, where the vulnerability record includes information of the service vulnerabilities such as manifestation of the service vulnerabilities, conditions and operations that would lead to the service vulnerabilities, impacts of the service vulnerabilities, etc.

The blockchain network 302 can provide access to the vulnerability record to the service provider 308 so that the service provider 308 can obtain the information of the service vulnerabilities. The service provider 308 can analyze the information of the service vulnerabilities and generate a resolution (e.g., a software patch, a hardware replacement, etc.) to fix or otherwise address or mitigate the service vulnerabilities. The service provider 308 can apply the resolution and notify the blockchain network 302 of the resolution, for example, by sending a resolution notification. The blockchain network 302 can update the vulnerability record based on the resolution notification from the service provider 308.

In some embodiments, the service provider 308 can provide a token (e.g., a crypto token) to the security specialist 304 as a reward for identifying the service vulnerabilities. The blockchain network 302 can provide access to the vulnerability record to service users 306 and security service providers 310 so that they can obtain the information of the service vulnerabilities and the resolution to the service vulnerabilities. The service users 306 and security service providers 310 may independently analyze the information of the service vulnerabilities and the resolution, check whether there are other service vulnerabilities related to the known service vulnerabilities, upgrade respective cybersecurity solutions (e.g., upgrade anti-malwares and firewalls, etc.) and perform any other appropriate operations.

Figure 4:
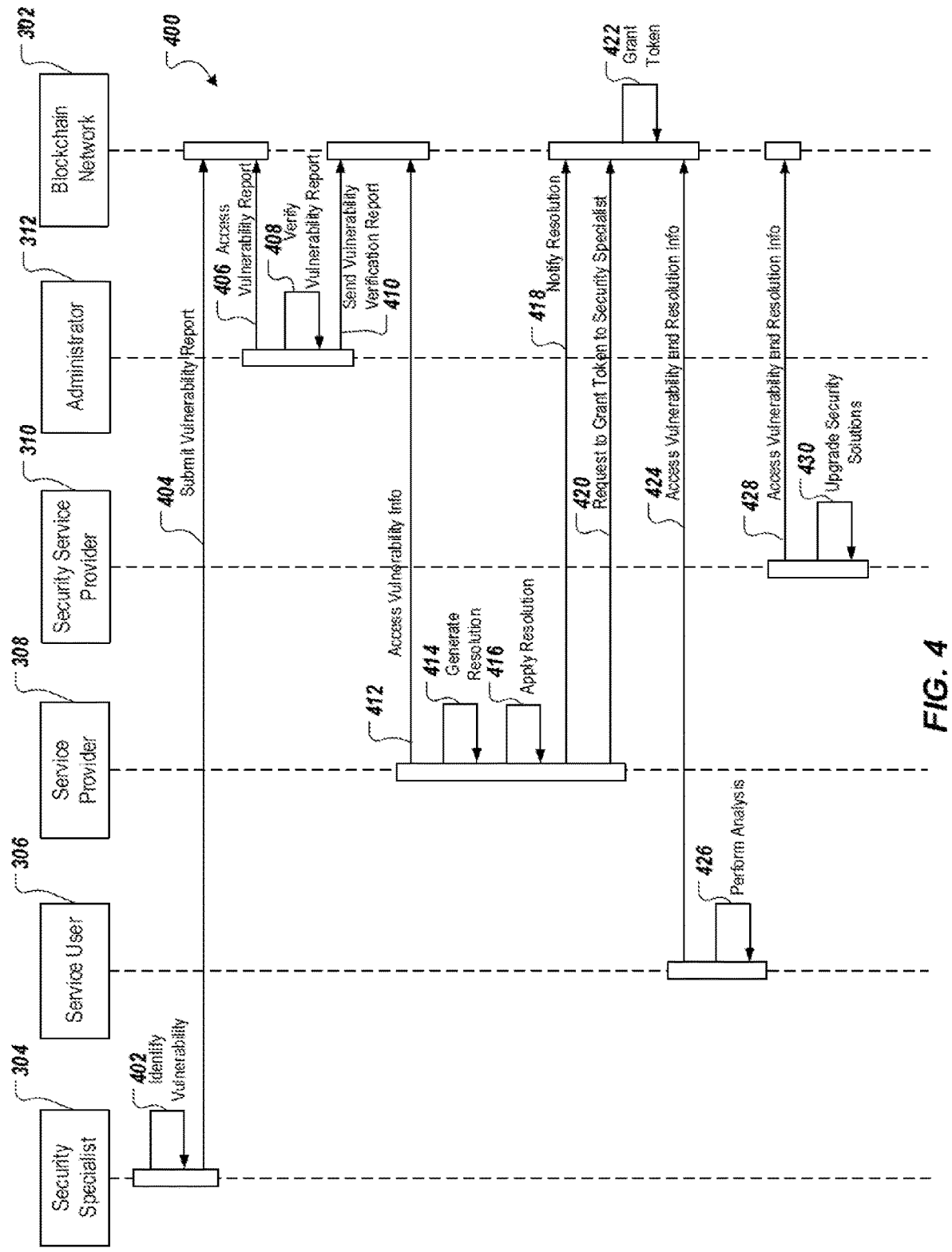
FIG. 4 depicts an example of a process that can be executed in accordance with embodiments of this specification.

FIG. 4 depicts an example of a process 400 that can be executed in accordance with embodiments of this specification. The signal flow represents a process 400 for managing service vulnerabilities based on a blockchain network. For convenience, the process will be described as being performed by a system of one or more computers, located in one or more locations, and programmed appropriately in accordance with this specification. For example, a distributed system (e.g., the system 300 of FIG. 3), appropriately programmed, can perform the process.

In some embodiments, one or more smart contracts can be defined for facilitating managing service vulnerabilities. The one or more smart contracts can be negotiated among the parties or participants of the cybersecurity vulnerability management scheme, such as the one or more security specialists 304, one or more service users 306, one or more service providers 308, one or more security service providers 310, and one or more administrators 312. In some embodiments, the one or more smart contracts can include defined interfaces between each of the parties or participants of the cybersecurity vulnerability management scheme and the blockchain network (e.g., a consensus node of the blockchain network). In some embodiments, the one or more smart contracts can include functions or operations that can be performed by each of the parties or participants of the cybersecurity vulnerability management scheme. For example, the functions or operations can include a function for the security specialist to submit a vulnerability report to the blockchain network, a function for the administrator to submit a vulnerability verification report to the blockchain network, a function for the service provider to submit information of a resolution to the identified vulnerabilities to the blockchain network, etc. In some embodiments, the one or more smart contracts can define authorized entities for performing certain functions. In some embodiments, the one or more smart contracts can be deployed on the blockchain network and be called by an authorized entity to execute one or more functions on the blockchain network for cybersecurity vulnerability management. The smart contract can facilitate enforcing trackable and credible interactions between the participating entities and blockchain network.

The process 400 starts at 402 where a security specialist 304 identifies one or more service vulnerabilities of a service provided by a service provider 308. In some examples, the service can include a software, a hardware, and/or network resources that implemented by the service provider 308 in a computer system or network. In general, service vulnerabilities can include a weakness in the software, hardware, or network that can be exploited by a threat actor, such as a cyber-attacker, to perform unauthorized actions within the computer system or network. For example, the service vulnerabilities can include an entry point in a program of the service that can be used by malicious actors to breach into protected computer systems and networks and to infiltrate restricted data.

Other examples of service vulnerabilities include the following: a weakness in automated system security procedures, administrative controls, internal controls, and so forth, that could be exploited by a threat to gain unauthorized access to information or disrupt critical processing; a weakness in system security procedures, hardware design, internal controls, etc., which could be exploited to gain unauthorized access to classified or sensitive information; a weakness in the physical layout, organization, procedures, personnel, management, administration, hardware, or software that may be exploited to cause harm to the computer system or activity; and any weakness or flaw existing in a system.

At 404, the security specialist 304 submits a vulnerability report to the blockchain network 302. In some embodiments, the security specialist 304 can generate the vulnerability report based on the service vulnerabilities as determined at step 402. For example, the vulnerability report can identify a service provided by a service provider 308, a version of the service, the service vulnerabilities identified in the service, a timestamp of identification of the service vulnerabilities, and/or any other information of the service vulnerabilities. In some embodiments, the security specialist 304 can sign the vulnerability verification report using its private key and include a digital signature of the security specialist 304 in the vulnerability report.

In some embodiments, the security specialist 304 submits the vulnerability report to the blockchain network 302 by making a contract call to a smart contract executing on the blockchain network 302. The smart contract can provide one or more interfaces and functions for submitting the vulnerability report to the blockchain network 302. In some embodiments, the smart contract can be executed to determine whether the security specialist 304 is authorized to submit the vulnerability report to the blockchain network 302. For example, blockchain network 302 can verify a digital signature of the security specialist 304 included in the vulnerability report to determine whether the security specialist 304 is authorized. If it is determined that the security specialist 304 is authorized to submit the vulnerability report to the blockchain network 302, the blockchain network 302 can accept and store the vulnerability report from the security specialist 304. In some embodiments, the blockchain network can store the vulnerability report on the blockchain network, for example, by storing on a block of each consensus node of the blockchain network. If it is determined that the security specialist 304 is not authorized to submit the vulnerability report to the blockchain network 302, the blockchain network 302 can decline the vulnerability report from the security specialist 304.

At 406, the administrator 312 accesses the vulnerability report from the blockchain network 302. In some embodiments, the administrator 312 can monitor the block of the blockchain network 302 for any update or change. In some embodiments, after identifying that a new vulnerability report is stored in the block of the blockchain network 302, the administrator 312 can send a request to the blockchain network 302 for the vulnerability report. The blockchain network 302 determines whether the administrator 312 is authorized to obtain the vulnerability report. For example, the blockchain network 302 can determine whether a digital signature of the administrator 312 that is included in the request is valid. If it is determined that the administrator 312 is authorized to obtain the vulnerability report, the blockchain network 302 sends the vulnerability report to the administrator 312. If it is determined that the administrator 312 is not authorized to obtain the vulnerability report, the blockchain network 302 can reject the request from the administrator 312 to obtain the vulnerability report.

In alternative embodiments, the blockchain network 302 can periodically push the vulnerability report to administrators 312 that are authorized to obtain the vulnerability report. For example, a number of administrators 312 can subscribe to a vulnerability report push service from the blockchain network 302. The blockchain network 302 can send a vulnerability report to the subscribing administrators 302 after it receives the vulnerability report from the security specialist 304.

At 408, the administrator 312 verifies the vulnerability report from the blockchain network 302. For example, the administrator 312 can determine whether the one or more service vulnerabilities identified in the vulnerability report actually exist and whether information of the one or more service vulnerabilities are accurate. In some embodiments, the administrator 312 can perform a mock cyber-attack by exploiting the service vulnerabilities. If it is determined that the mock cyber-attack is successful, the administrator 312 can determine the service vulnerabilities actually exist and the vulnerability report is valid. If it is determined that the mock cyber-attack is not successful, the administrator 312 can determine the service vulnerabilities does not exist and the vulnerability report is invalid. After verifying the vulnerability report, the administrator 312 can generate a vulnerability verification report. In some embodiments, the vulnerability verification report can include the service vulnerabilities identified in the vulnerability report, and a verification report indicating whether the service vulnerabilities have been verified to exist. In some embodiments, the administrator 312 can sign the vulnerability verification report using its private key and include a digital signature of the administrator 312 in the vulnerability verification report.

At 410, the administrator 312 sends the vulnerability verification report to the blockchain network 302. In some embodiments, the administrator 312 can submit the vulnerability verification report by making a contract call to a smart contract executing on the blockchain network 302. The blockchain network 302 can determine whether the administrator 312 is authorized to submit the vulnerability verification report, for example, by verifying a digital signature of the administrator 312. If it is determined that the administrator 312 is authorized to submit the vulnerability verification report, the blockchain network 302 can accept and store the vulnerability verification report. If it is determined that the administrator 312 is not authorized to submit the vulnerability verification report, the blockchain network 302 can decline the vulnerability verification report.

In some embodiments, the blockchain network 302 generates or updates a vulnerability record. The blockchain network 302 can generate or update the vulnerability record based on the vulnerability report and the vulnerability verification report. The vulnerability record includes information of the service vulnerability that include some or all information included in the vulnerability report and/or the vulnerability verification report. For example, the vulnerability record can include a number of vulnerability entries, where each vulnerability entry can include a service name of a service, a version of the service, an identifier of a service provider 308 that provides the service, a description of an identified vulnerability of the service, a timestamp of identification of the vulnerability, and a verification result of the identified vulnerability from the administrator 312, etc.

At 412, the service provider 308 accesses the blockchain network 302 to obtain the vulnerability information. In some embodiments, the service provider 308 can monitor the block of the blockchain network 302 for any update or change. In some embodiments, after identifying an update of the vulnerability record stored in the block of the blockchain network 302, the service provider 308 can send a request to the blockchain network 302 to access the vulnerability record stored in the blockchain network 302. The blockchain network 302 can determine whether the service provider 308 is authorized to access the vulnerability record. For example, the blockchain network 302 can determine whether a digital signature of the service provider 308 that is included in the request is valid. If it is determined that the service provider 308 is authorized to access the vulnerability record, the blockchain network 302 can send the vulnerability record to the service provider 308. In some embodiments, the blockchain network 302 determines a subset of the vulnerability record that are related to the service provider 308 and sends the subset of the vulnerability record to the service provider 308. If it is determined that the service provider 308 is not authorized to access the vulnerability record, the blockchain network 302 can reject the request from the service provider 308 to access the vulnerability record.

In alternative embodiments, the blockchain network 302 can periodically push the vulnerability record to the service providers 308 that are authorized to access the vulnerability record. For example, a number of service providers 308 can subscribe to a vulnerability record push service from the blockchain network 302. The blockchain network 302 can send a most recent vulnerability record to the subscribing service providers 308. In some embodiments, the blockchain network 302 identifies a subset of the vulnerability record that are related to each of the subscribing service providers 308, and sends the subset of the vulnerability record to a corresponding service provider 308.

At 414, the service provider 308 generates a resolution to the identified service vulnerabilities based on the vulnerability information obtained from the blockchain network 302. The service provider 308 can analyze the vulnerability information to identify a potential cause of the service vulnerabilities. The service provider 308 can analyze the vulnerability information to identify software, hardware, and network resources that are negatively affected by the service vulnerabilities. In some embodiments, the service provider 308 can generate a software patch to remedy a service vulnerability related to software. In some embodiments, the service provider 308 can identify a dysfunctional hardware component that needs to be replaced. In some embodiments, the service provider 308 can also identify a loophole in a network firewall and generate a firewall update to remedy the loophole.

At 416, the service provider 308 applies the resolution to remedy the service vulnerabilities. For example, the service provider 308 can apply a software patch to a software that is affected by the service vulnerabilities. In some embodiments, the service provider 308 can replace a dysfunctional hardware component. In some embodiments, the service provider 308 can apply a firewall update to remedy a loophole in the firewall. In some embodiments, the service provider 308 can send the resolution, such as a software patch, to service users 306 of the service that are affected by the service vulnerabilities.

At 418, the service provider 308 sends a notification to the blockchain network 302 to notify the blockchain network 302 of the resolution. In some embodiments, the service provider 308 can sign the notification using its private key and include a digital signature of the service provider 308 in the notification. In some embodiments, the service provider 308 sends the notification by making a contract call to a smart contract executing on the blockchain network 302. In some embodiments, the notification includes a service name of a service, a version of the service, an identifier of a service provider 308 that provides the service, a description of an identified vulnerability of the service, and information of a resolution (e.g., a network address to obtain or download the resolution, a version of the resolution), etc. As noted, the blockchain network 302 stores a vulnerability record. The blockchain network 302 can update the vulnerability record to include some or all of the information of the resolution to the service vulnerabilities.

At 420, in some embodiments, the service provider 308 sends a request to the blockchain network 302 to grant a token to the security specialist 304 that identifies the service vulnerabilities. The token can be a crypto token that is paid to the security specialist 304 as an incentive to identify the service vulnerabilities. In some embodiments, the service provider 308 can initiate a transaction to add, deposit, or transfer the crypto token to an account of the security specialist 304 on the blockchain network 302.

At 422, in some embodiments, the blockchain network 302 grants the token to the security specialist. In some embodiments, the blockchain network 302 can execute the transaction to add, deposit, or transfer the crypto token to the account of the security specialist 304 on the blockchain network 302.

In some embodiments, the blockchain network 302 can provide access to the vulnerability and resolution information in the vulnerability record to other participants of the system 300, such as the service user 306, and the security service provider 310. For example, the blockchain network 302 can modify the access authority of the vulnerability record on the blockchain network 302 so that the service user 306 and the security service provider 310 can access the vulnerability record.

At 424, the service user 306 accesses the blockchain network 302 to obtain the vulnerability and resolution information in the vulnerability record. In some embodiments, the service user 306 can monitor the block of the blockchain network 302 for any update or change. In some embodiments, after identifying an update of the vulnerability record stored in the block of the blockchain network 302, the service provider 308 can send a request to the blockchain network 302 for the vulnerability and resolution information. The blockchain network 302 can verify an identity of the service user 306, and send the vulnerability and resolution information to the service user 306 if the identify verification is successful. In some embodiments, the blockchain network 302 can periodically push the vulnerability and resolution information to subscribing service users 306.

At 426, the service user 306 performs an analysis on the vulnerability and/or resolution information. In some embodiments, the service user 306 can perform systematic analysis on programs, protocols, networks, database systems to determine whether the service vulnerabilities have been remedied. In some embodiments, the service user 306 can determine whether there is data loss or data corruption caused by the service vulnerabilities. If there is data loss or data corruption, the service user 306 can use data retrieval methods or tools to retrieve the lost data or corrupted data. In some embodiments, the service user 306 can apply additional resolution to the service vulnerabilities in addition to applying the resolution provided by the service provider 308. In some embodiments, the service user 306 can perform analysis on one or more vulnerability and/or resolutions, for example, during a certain time period, from a certain service provider, or due to a certain cause. In some embodiments, the service user 306 can generate a report detailing the analysis results. In some embodiments, the service user 306 can perform additional or different analyses and operations based on the on the vulnerability and/or resolution information.

At 428, the security service provider 310 accesses the blockchain network 302 to obtain the vulnerability and resolution information in the vulnerability record. In some embodiments, the security service provider 310 can monitor the block of the blockchain network 302 for any update or change. In some embodiments, after identifying an update of the vulnerability record stored in the block of the blockchain network 302, the security service provider 310 can send a request to the blockchain network 302 for the vulnerability and resolution information. The blockchain network 302 can verify an identity of the security service provider 310, and send the vulnerability and resolution information to the security service provider 310 if the identify verification is successful. In some embodiments, the blockchain network 302 can periodically push the vulnerability and resolution information to subscribing security service providers 310.

At 430, the security service provider 310 updates or upgrades its security solutions. For example, a security service provider 310 that provides a firewall service or an anti-malware to services users 306 can provide an update or patch to the firewall service or the anti-malware to address the identified service vulnerabilities. In some embodiments, the security service provider 310 can perform analysis on the discovered vulnerability and/or resolutions, for example, during a certain time period, from a certain service provider, or due to a certain cause. In some embodiments, the security service provider 310 can generate a report detailing the analysis results. In some embodiments, the security service provider 310 can predict other potential vulnerabilities and proactively provide security solutions to the other potential vulnerabilities. In some embodiments, the security service provider 310 can perform additional or different analyses and operations based on the on the vulnerability and/or resolution information.

Figure 5:
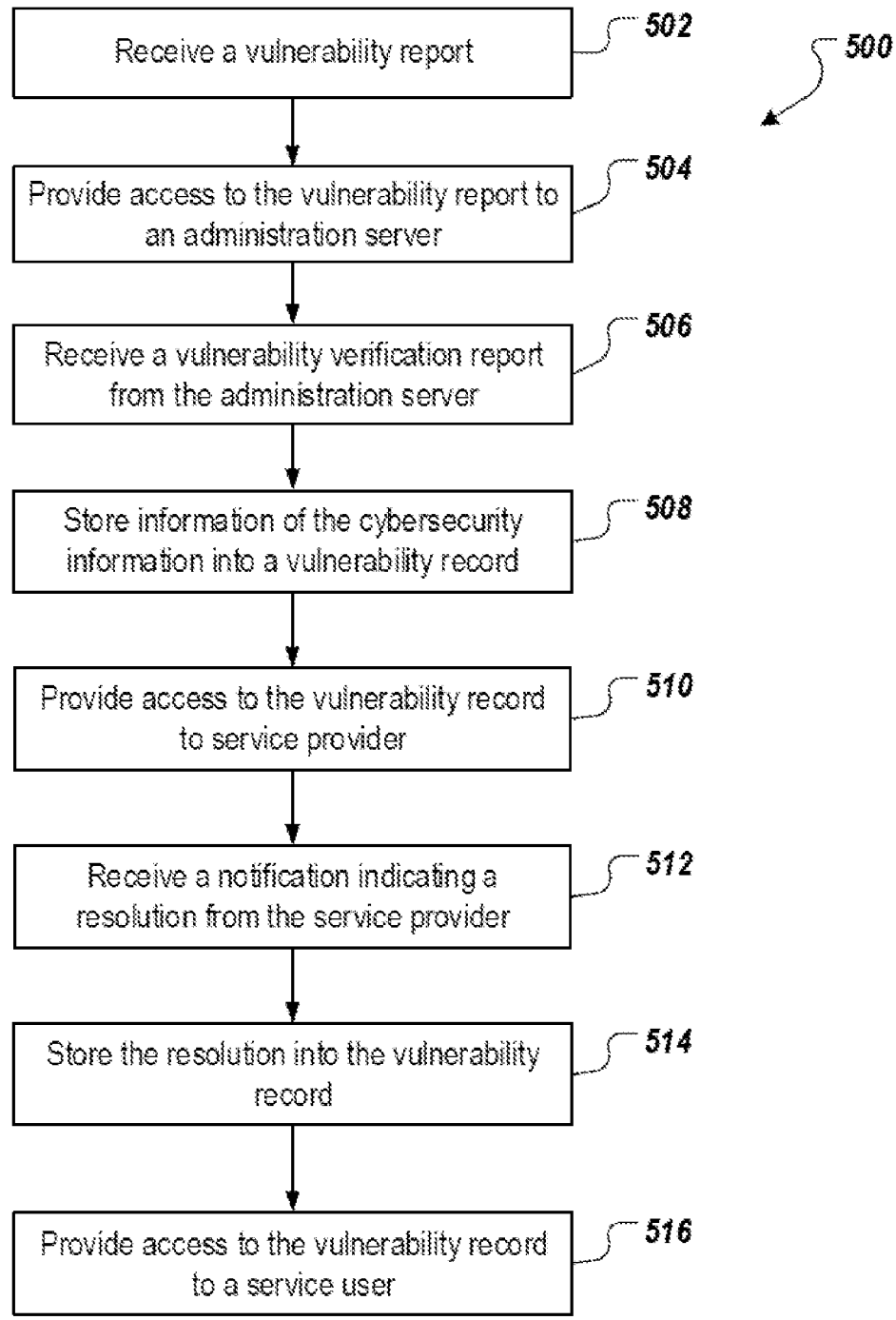
FIG. 5 depicts an example of a process that can be executed in accordance with embodiments of this specification.

FIG. 5 is a flowchart of an example of a process 500 for cybersecurity vulnerability management. The process 500 can be a process performed by a blockchain network in the context of the process 400 of FIG. 4. For convenience, the process 500 will be described as being performed by a system of one or more computers, located in one or more locations, and programmed appropriately in accordance with this specification. For example, a distributed system, e.g., the blockchain system 300 of FIG. 3, appropriately programmed, can perform the process 500.

At 502, a blockchain network (e.g., the blockchain network 302) receives a vulnerability report from a client device (e.g., the security specialist 304), for example, according to techniques as described with respect to 404 of FIG. 4. In some embodiments, the vulnerability report indicates a cybersecurity vulnerability of a service provided by a service provider (e.g., the service provider 308). In some embodiments, the cybersecurity vulnerability includes a software vulnerability, a hardware vulnerability, or a combination of both.

At 504, the blockchain network provides access to the vulnerability report to an administration server (e.g., the administrator 312) for verifying the cybersecurity vulnerability in the vulnerability report, for example, according to techniques as described with respect to 406 of FIG. 4. In some embodiments, the blockchain network provides access to the vulnerability report to the administration server by pushing the vulnerability report to the administration server, for example, due to the administration server's subscription to a vulnerability report stored in the blockchain network. In some embodiments, the blockchain network receives a request from the administration server for the vulnerability report. The blockchain network can determine whether the administration server is authorized to obtain the vulnerability report. If it is determined that the administration server is authorized to obtain the vulnerability report, the blockchain network sends the vulnerability report to the administration server. In some embodiments, if it is determined that the administration server is not authorized to obtain the vulnerability report, the blockchain network can reject the request from the administration server to obtain the vulnerability report.

At 506, the blockchain network receives a vulnerability verification report from the administration server, for example, according to techniques as described with respect to 410 of FIG. 4. The vulnerability verification report indicates a verification of the cybersecurity vulnerability in the vulnerability report. In some embodiments, the blockchain network can determine whether the administration server is authorized to submit the vulnerability verification report. If it is determined that the administration server is authorized to submit the vulnerability verification report, the blockchain network can accept and store the vulnerability verification report. If it is determined that the administration server is not authorized to submit the vulnerability verification report, the blockchain network can decline the vulnerability verification report.

In some embodiments, the vulnerability report is received by the blockchain network from a client device. In some embodiments, the blockchain network receives a request from the service provider to reward a blockchain account of the client device. In response to receiving the request from the service provider, the blockchain network can provides a digital token as a reward to the blockchain account of the client device.

At 508, the blockchain network stores information of the cybersecurity information into a vulnerability report. In some embodiments, the vulnerability record is generated based on the vulnerability report and the vulnerability verification report. The vulnerability record includes information of the cybersecurity vulnerability. For example, the information of the cybersecurity vulnerability can include some or all information included in the vulnerability report and/or the vulnerability verification report. For example, the vulnerability record can include a number of vulnerability entries, where each vulnerability entry can include a service name of a service, a version of the service, an identifier of a service provider that provides the service, a description of an identified vulnerability of the service, a timestamp of identification of the vulnerability, and a verification result of the identified vulnerability from the administration server, etc.

At 510, the blockchain network provides access to the vulnerability record to the service provider, for example, according to techniques as described with respect to 412 of FIG. 4. In some embodiments, the blockchain network provides access to the vulnerability record to the service provider by pushing the vulnerability record to the service provider, for example, due to the service provider's subscription to the vulnerability report stored in the blockchain network. In some embodiments, the blockchain network can determine whether the service provider is authorized to access the vulnerability record. If it is determined that the service provider is authorized to access the vulnerability record, the blockchain network can send the vulnerability record to the service provider. In some embodiments, the blockchain network determines a subset of the vulnerability record that are related to the service provider and sends the subset of the vulnerability record to the service provider. In some embodiments, if it is determined that the service provider is not authorized to access the vulnerability record, the blockchain network can reject the request from the service provider to access the vulnerability record.

At 512, the blockchain network receives a notification indicating a resolution from the service provider, for example, according to techniques as described with respect to 418 of FIG. 4. The notification indicates a resolution to the cybersecurity vulnerability. In some embodiments, the service provider sends the notification by making a contract call to a smart contract executing on the blockchain network. In some embodiments, the notification includes a service name of a service, a version of the service, an identifier of a service provider that provides the service, a description of an identified vulnerability of the service, and information of a resolution (e.g., a network address to obtain or download the resolution, a version of the resolution), etc.

At 514, the blockchain network stores the resolution to the cybersecurity vulnerability into the vulnerability record. In some embodiments, the blockchain network can update the vulnerability record to include some or all of the information of the resolution to the service vulnerabilities.

At 516, the blockchain network provides access to the vulnerability record to a service user of the service. In some embodiments, the service user can monitor the block of the blockchain network for any update or change. In some embodiments, after identifying an update of the vulnerability record stored in the block of the blockchain network, the service provider can send a request to the blockchain network for the vulnerability and resolution information. The blockchain network can verify an identity of the service user, and send the vulnerability and resolution information to the service user if the identify verification is successful. In some embodiments, the blockchain network can periodically push the vulnerability and resolution information to subscribing service users.

Figure 6:
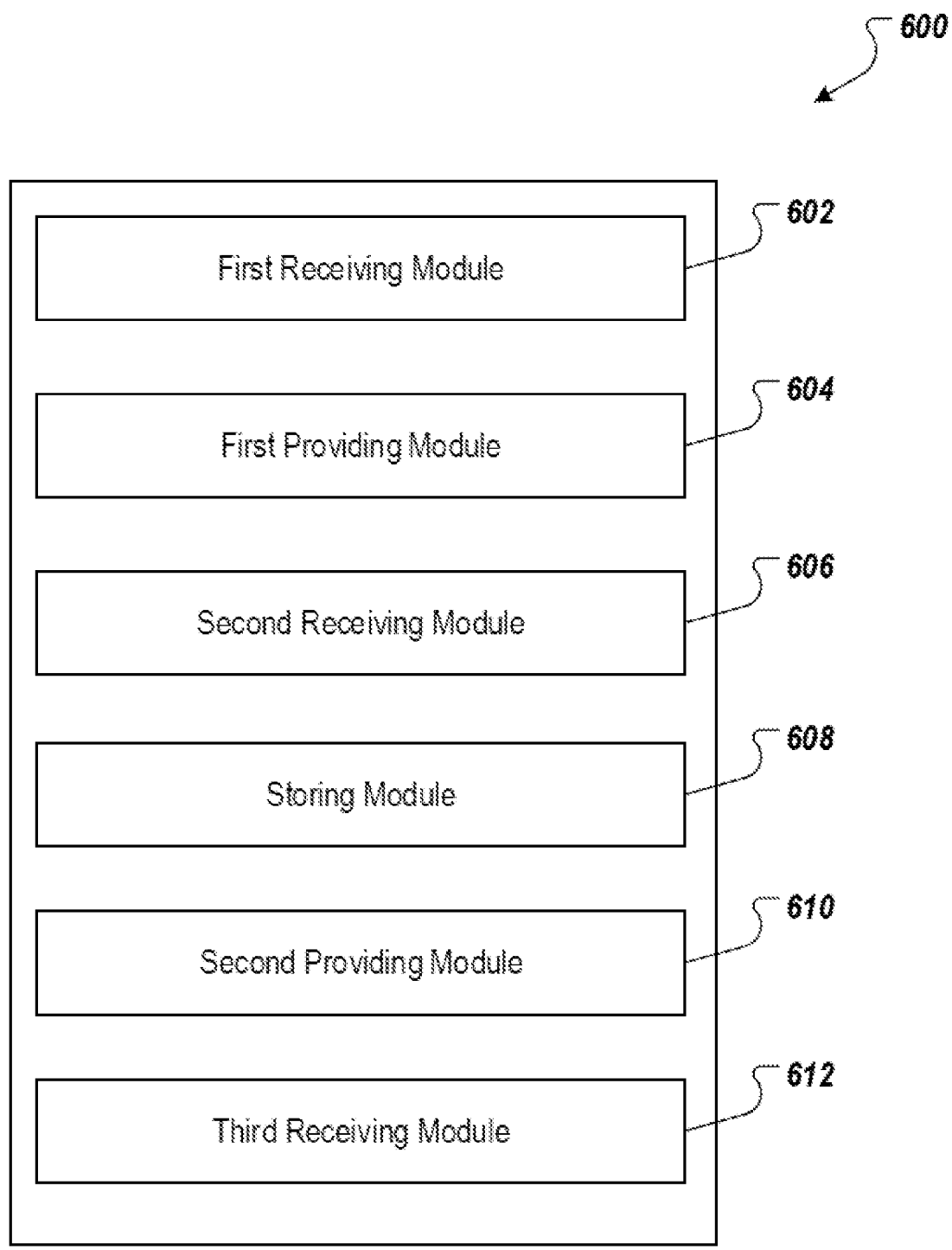
FIG. 6 depicts examples of modules of an apparatus in accordance with embodiments of this specification.

FIG. 6 depicts examples of modules of an apparatus 600 in accordance with embodiments of this specification. The apparatus 600 can be an example of an embodiment of a node of a blockchain network configured to manage cybersecurity vulnerabilities. The apparatus 600 can correspond to the embodiments described above, and the apparatus 600 includes the following: a first receiving module 602 that receives a vulnerability report indicating a cybersecurity vulnerability of a service provided by a service provider; a first providing module 604 that provides access to the vulnerability report to an administration server for verifying the cybersecurity vulnerability in the vulnerability report; a second receiving module 606 that receives a vulnerability verification report from the administration server indicating a verification of the cybersecurity vulnerability in the vulnerability report; a storing module 608 that stores information of the cybersecurity vulnerability into a vulnerability record that is stored on the blockchain network, wherein the information of the cybersecurity vulnerability is based on the vulnerability report and the vulnerability verification report; a second providing module 610 that provides access to the vulnerability record to the service provider; and a third receiving module 612 that receives a notification from the service provider indicating a resolution to the cybersecurity vulnerability.

In an optional embodiment, the cybersecurity vulnerability includes at least one of a software vulnerability or a hardware vulnerability.

In an optional embodiment, the apparatus 600 further includes: a receiving sub-module that receives a request from the administration server to access the vulnerability report; a determining sub-module that determines whether the administration server is authorized to access the vulnerability report; and a sending sub-module that sends the vulnerability report to the administration server in response to determining that the administration server is authorized to access the vulnerability report.

In an optional embodiment, the apparatus 600 further includes: a receiving sub-module that receives a request from the service provider to access the vulnerability verification report; a determining sub-module that determines whether the service provider is authorized to access the vulnerability verification report; and a sending sub-module that sends the vulnerability verification report to the service provider in response to determining that the service provider is authorized to access the vulnerability verification report.

In an optional embodiment, the vulnerability report is received by the blockchain network from a client device and the apparatus 600 further includes the following: a receiving sub-module that receives from the service provider a request to reward a blockchain account of the client device; and a providing sub-module that provides a digital token as a reward to the blockchain account of the client device in response to receiving the request from the service provider.

In an optional embodiment, the apparatus 600 further includes: a storing sub-module that stores the resolution to the cybersecurity vulnerability into the vulnerability record in response to receiving the notification from the service provider; and a providing sub-module that provides access to the vulnerability record to a service user of the service.

In an optional embodiment, the resolution to the cybersecurity vulnerability comprises at least one of the following: a software patch, or a hardware replacement.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a blockchain cybersecurity vulnerability managing apparatus. The blockchain cybersecurity vulnerability managing apparatus can be an example of a blockchain network node configured to manage cybersecurity vulnerability. An execution body in essence can be an electronic device, and the electronic device includes the following: one or more processors; and a memory configured to store an executable instruction of the one or more processors.

The techniques described in this specification produce several technical effects. In some embodiments, the security specialist submits a vulnerability report to the blockchain network and the blockchain network determines whether the security specialist is authorized to submit the vulnerability report that includes information of one or more cybersecurity vulnerabilities. This prevents unauthorized entities from publishing malicious content to the blockchain network that compromises the security of the blockchain network. In some embodiments, an administrator accesses the blockchain network to obtain the vulnerability report and verifies whether the cybersecurity vulnerabilities identified in the vulnerability report actually exist. The blockchain network determines whether the administrator is authorized to access the vulnerability report before granting an access to the administrator. This prevents unauthorized entities from obtaining the information of the identified cybersecurity vulnerabilities. If an unauthorized entity, such as a malicious actor, obtains the vulnerability report, the malicious actor can exploit the vulnerabilities identified in the report, breach into the computer system and network, and infiltrate protected data. As such, the techniques as described herein improve security of the computer systems, networks, and database systems implementing the techniques.

Furthermore, in some embodiments, the security specialist submits a vulnerability report to the blockchain network by making a contract call to a smart contract executing on the blockchain network. The administrator submits a vulnerability verification report to the blockchain network by making a contract call to the smart contract. A service provider submits information of a resolution to the identified vulnerabilities to the blockchain network by making a contract call to the smart contract. The smart contract facilitates enforcing trackable and credible interaction between the participating entities (such as the security specialist, the administrator, and the service provider, etc.) and blockchain network.

Moreover, in some embodiments, the blockchain network maintains a vulnerability record that includes information of the identified cybersecurity vulnerabilities and the resolution to the vulnerabilities. The blockchain network can grant access to the vulnerability record to authorized participating entities. In this way, the vulnerability record is shared by all the authorized participating entities so that each entity does not need to maintain an individual vulnerability record. This conserves the computing resources and the network resources to maintain the vulnerability record individually by each entity.

Described embodiments of the subject matter can include one or more features, alone or in combination. For example, in a first embodiment, a method for cybersecurity vulnerability management includes: receiving, by a blockchain network, a vulnerability report indicating a cybersecurity vulnerability of a service provided by a service provider; providing, by the blockchain network, access to the vulnerability report to an administration server for verifying the cybersecurity vulnerability in the vulnerability report; receiving, by the blockchain network and from the administration server, a vulnerability verification report indicating a verification of the cybersecurity vulnerability in the vulnerability report; storing, by the blockchain network, information of the cybersecurity vulnerability into a vulnerability record that is stored on the blockchain network, wherein the information of the cybersecurity vulnerability is based on the vulnerability report and the vulnerability verification report; providing, by the blockchain network, access to the vulnerability record to the service provider; and receiving, by the blockchain network and from the service provider, a notification indicating a resolution to the cybersecurity vulnerability.

The foregoing and other described embodiments can each, optionally, include one or more of the following features:

A first feature, combinable with any of the following features, specifies that the cybersecurity vulnerability comprises at least one of a software vulnerability or a hardware vulnerability.

A second feature, combinable with any of the previous or following features, specifies that the method further includes: receiving, by the blockchain network and from the administration server, a request to access the vulnerability report; determining, by the blockchain network, whether the administration server is authorized to access the vulnerability report; and in response to determining that the administration server is authorized to access the vulnerability report, sending the vulnerability report to the administration server.

A third feature, combinable with any of the previous or following features, specifies that the method further includes: receiving, by the blockchain network and from the service provider, a request to access the vulnerability verification report; determining, by the blockchain network, whether the service provider is authorized to access the vulnerability verification report; and in response to determining that the service provider is authorized to access the vulnerability verification report, sending the vulnerability verification report to the service provider.

A fourth feature, combinable with any of the previous or following features, specifies that wherein the vulnerability report is received by the blockchain network from a client device, and that the method further includes: receiving, by the blockchain network and from the service provider, a request to reward a blockchain account of the client device; and in response to receiving the request from the service provider, providing, by the blockchain network, a digital token as a reward to the blockchain account of the client device.

A fifth feature, combinable with any of the previous or following features, specifies that the method further includes: in response to receiving the notification from the service provider, storing, by the blockchain network, the resolution to the cybersecurity vulnerability into the vulnerability record; and providing, by the blockchain network, access to the vulnerability record to a service user of the service.

A sixth feature, combinable with any of the previous or following features, specifies that the resolution to the cybersecurity vulnerability includes at least one of the following: a software patch, or a hardware replacement.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for cybersecurity vulnerability management, the method comprising:
    maintaining, by a blockchain network, a blockchain that comprises one or more blocks storing a vulnerability record, wherein the vulnerability record comprises information of one or more cybersecurity vulnerabilities of computer-implemented services;
    maintaining, by the blockchain network, a smart contract for a cybersecurity vulnerability management scheme, wherein the smart contract comprises defined parties of the cybersecurity vulnerability management scheme and defined functions operable by the defined parties of the cybersecurity vulnerability management scheme, wherein the defined parties comprise an administration server and one or more service providers;
    receiving, by the blockchain network and from a client device, via a smart contract call of a function defined in the smart contract for submitting a vulnerability report, the vulnerability report indicating a cybersecurity vulnerability of a computer-implemented service provided by a service provider;
    providing, by the blockchain network, access to the vulnerability report to the administration server for verifying the cybersecurity vulnerability in the vulnerability report;
    receiving, by the blockchain network and from the administration server, a vulnerability verification report indicating a verification of the cybersecurity vulnerability in the vulnerability report submitted by the client device, wherein the vulnerability verification report comprise an identifier of the administration server;
    storing, by the blockchain network, information of the cybersecurity vulnerability into the vulnerability record that is stored on the blockchain network, wherein the information of the cybersecurity vulnerability is based on the vulnerability report and the vulnerability verification report;
    after storing the information of the cybersecurity vulnerability into the vulnerability record, providing, by the blockchain network, access to the vulnerability record to the service provider; and
    after providing the access to the vulnerability record to the service provider, receiving, by the blockchain network and from the service provider, a notification indicating a resolution to the cybersecurity vulnerability, wherein the notification comprises a service name of the computer-implemented service provided by the service provider, an identifier of the service provider, a description of the cybersecurity vulnerability, and a description of the resolution to the cybersecurity vulnerability.

2. The method of claim 1, wherein the cybersecurity vulnerability comprises at least one of a software vulnerability or a hardware vulnerability.

3. The method of claim 1, further comprising:
    receiving, by the blockchain network and from the administration server, a request to access the vulnerability report;
    determining, by the blockchain network, whether the administration server is authorized to access the vulnerability report; and
    in response to determining that the administration server is authorized to access the vulnerability report, sending the vulnerability report to the administration server.

4. The method of claim 1, further comprising:
    receiving, by the blockchain network and from the service provider, a request to access the vulnerability verification report;
    determining, by the blockchain network, whether the service provider is authorized to access the vulnerability verification report; and
    in response to determining that the service provider is authorized to access the vulnerability verification report, sending the vulnerability verification report to the service provider.

5. The method of claim 1, wherein the method further comprises:
    receiving, by the blockchain network and from the service provider, a request to reward a blockchain account of the client device; and
    in response to receiving the request from the service provider, providing, by the blockchain network, a reward to the blockchain account of the client device.

6. The method of claim 1, further comprising:
    in response to receiving the notification from the service provider, storing, by the blockchain network, the resolution to the cybersecurity vulnerability into the vulnerability record; and
    providing, by the blockchain network, access to the vulnerability record to a service user of the computer-implemented service.

7. The method of claim 1, wherein the resolution to the cybersecurity vulnerability comprises at least one of the following: a software patch, or a hardware replacement.

8. The method of claim 1, wherein the smart contract comprises authorized entities, among the defined parties of the cybersecurity vulnerability management scheme, that are authorized to perform one or more of the defined functions.

9. The method of claim 1, wherein the defined parties comprise one or more of a security specialist who identifies the cybersecurity vulnerability of the computer-implemented service or a service user of the computer-implemented service provided by the service provider, and wherein the smart contract call of the function defined in the smart contract for submitting the vulnerability report is from one of the one or more of the security specialist.

10. A non-transitory, computer-readable storage medium storing one or more instructions executable by a computer system to perform operations for cybersecurity vulnerability management, the operations comprising:
    maintaining, by a blockchain network, a blockchain that comprises one or more blocks storing a vulnerability record, wherein the vulnerability record comprises information of one or more cybersecurity vulnerabilities of computer-implemented services;
    maintaining, by the blockchain network, a smart contract for a cybersecurity vulnerability management scheme, wherein the smart contract comprises defined parties of the cybersecurity vulnerability management scheme and defined functions operable by the defined parties of the cybersecurity vulnerability management scheme, wherein the defined parties comprise an administration server and one or more service providers;

receiving, by the blockchain network and from a client device, via a smart contract call of a function defined in the smart contract for submitting a vulnerability report, the vulnerability report indicating a cybersecurity vulnerability of a computer-implemented service provided by a service provider;

providing, by the blockchain network, access to the vulnerability report to the administration server for verifying the cybersecurity vulnerability in the vulnerability report;

receiving, by the blockchain network and from the administration server, a vulnerability verification report indicating a verification of the cybersecurity vulnerability in the vulnerability report submitted by the client device, wherein the vulnerability verification report comprise an identifier of the administration server;

storing, by the blockchain network, information of the cybersecurity vulnerability into the vulnerability record that is stored on the blockchain network, wherein the information of the cybersecurity vulnerability is based on the vulnerability report and the vulnerability verification report;

after storing the information of the cybersecurity vulnerability into the vulnerability record, providing, by the blockchain network, access to the vulnerability record to the service provider; and after providing the access to the vulnerability record to the service provider, receiving, by the blockchain network and from the service provider, a notification indicating a resolution to the cybersecurity vulnerability, wherein the notification comprises a service name of the computer-implemented service provided by the service provider, an identifier of the service provider, a description of the cybersecurity vulnerability, and a description of the resolution to the cybersecurity vulnerability.

11. The non-transitory, computer-readable storage medium of claim 10, wherein the cybersecurity vulnerability comprises at least one of a software vulnerability or a hardware vulnerability.

12. The non-transitory, computer-readable storage medium of claim 10, the operations further comprising:
receiving, by the blockchain network and from the administration server, a request to access the vulnerability report;
determining, by the blockchain network, whether the administration server is authorized to access the vulnerability report; and
in response to determining that the administration server is authorized to access the vulnerability report, sending the vulnerability report to the administration server.

13. The non-transitory, computer-readable storage medium of claim 10, the operations further comprising:
receiving, by the blockchain network and from the service provider, a request to access the vulnerability verification report;
determining, by the blockchain network, whether the service provider is authorized to access the vulnerability verification report; and
in response to determining that the service provider is authorized to access the vulnerability verification report, sending the vulnerability verification report to the service provider.

14. The non-transitory, computer-readable storage medium of claim 10, wherein the operations further comprise:

receiving, by the blockchain network and from the service provider, a request to reward a blockchain account of the client device; and
in response to receiving the request from the service provider, providing, by the blockchain network, a reward to the blockchain account of the client device.

15. The non-transitory, computer-readable storage medium of claim 10, the operations further comprising:
in response to receiving the notification from the service provider, storing, by the blockchain network, the resolution to the cybersecurity vulnerability into the vulnerability record; and
providing, by the blockchain network, access to the vulnerability record to a service user of the computer-implemented service.

16. The non-transitory, computer-readable storage medium of claim 10, wherein the resolution to the cybersecurity vulnerability comprises at least one of the following: a software patch, or a hardware replacement.

17. A system for cybersecurity vulnerability management, comprising:
one or more processors; and
one or more computer-readable memories coupled to the one or more processors and having instructions stored thereon that are executable by the one or more processors to perform operations comprising:
maintaining, by a blockchain network, a blockchain that comprises one or more blocks storing a vulnerability record, wherein the vulnerability record comprises information of one or more cybersecurity vulnerabilities of computer-implemented services;
maintaining, by the blockchain network, a smart contract for a cybersecurity vulnerability management scheme, wherein the smart contract comprises defined parties of the cybersecurity vulnerability management scheme and defined functions operable by the defined parties of the cybersecurity vulnerability management scheme, wherein the defined parties comprise an administration server and one or more service providers;
receiving, by the blockchain network and from a client device, via a smart contract call of a function defined in the smart contract for submitting a vulnerability report, the vulnerability report indicating a cybersecurity vulnerability of a computer-implemented service provided by a service provider;
providing, by the blockchain network, access to the vulnerability report to the administration server for verifying the cybersecurity vulnerability in the vulnerability report;
receiving, by the blockchain network and from the administration server, a vulnerability verification report indicating a verification of the cybersecurity vulnerability in the vulnerability report submitted by the client device, wherein the vulnerability verification report comprise an identifier of the administration server;
storing, by the blockchain network, information of the cybersecurity vulnerability into the vulnerability record that is stored on the blockchain network, wherein the information of the cybersecurity vulnerability is based on the vulnerability report and the vulnerability verification report;
after storing the information of the cybersecurity vulnerability into the vulnerability record, providing, by the blockchain network, access to the vulnerability record to the service provider; and after providing the access to the vulnerability record to the service provider, receiving, by the blockchain network and from the service provider, a notification indicating a resolution to the cybersecurity vulnerability, wherein the notification comprises a service name of the computer-implemented service provided by the service provider, an identifier of the service provider, a description of the cybersecurity vulnerability, and a description of the resolution to the cybersecurity vulnerability.

18. The system of claim 17, wherein the cybersecurity vulnerability comprises at least one of a software vulnerability or a hardware vulnerability.

19. The system of claim 17, the operations further comprising:
- receiving, by the blockchain network and from the administration server, a request to access the vulnerability report;
- determining, by the blockchain network, whether the administration server is authorized to access the vulnerability report; and
- in response to determining that the administration server is authorized to access the vulnerability report, sending the vulnerability report to the administration server.

20. The system of claim 17, the operations further comprising:
- receiving, by the blockchain network and from the service provider, a request to access the vulnerability verification report;
- determining, by the blockchain network, whether the service provider is authorized to access the vulnerability verification report; and
- in response to determining that the service provider is authorized to access the vulnerability verification report, sending the vulnerability verification report to the service provider.

21. The system of claim 17, wherein the operations further comprises:
- receiving, by the blockchain network and from the service provider, a request to reward a blockchain account of the client device; and
- in response to receiving the request from the service provider, providing, by the blockchain network, a reward to the blockchain account of the client device.

22. The system of claim 17, the operations further comprising:
- in response to receiving the notification from the service provider, storing, by the blockchain network, the resolution to the cybersecurity vulnerability into the vulnerability record; and
- providing, by the blockchain network, access to the vulnerability record to a service user of the computer-implemented service.

23. The system of claim 17, wherein the resolution to the cybersecurity vulnerability comprises at least one of the following: a software patch, or a hardware replacement.

* * * * *